United States Patent
Gierer et al.

[11] Patent Number: 5,785,629
[45] Date of Patent: Jul. 28, 1998

[54] PROCESS FOR CONTROLLING AN AUTOMATIC GEARBOX

[75] Inventors: Georg Gierer, Kressbronn; Wolfgang Wiest, Biberach, both of Germany

[73] Assignee: ZF Friedrichshafen AG, Friedrichshafen, Germany

[21] Appl. No.: 737,462

[22] PCT Filed: May 12, 1995

[86] PCT No.: PCT/EP95/01794

§ 371 Date: Nov. 15, 1996

§ 102(e) Date: Nov. 15, 1996

[87] PCT Pub. No.: WO95/32375

PCT Pub. Date: Nov. 30, 1995

[30] Foreign Application Priority Data

May 19, 1994 [DE] Germany ............... 44 17 477.2

[51] Int. Cl.$^6$ ............... F16H 61/02
[52] U.S. Cl. ............... 477/138; 477/128; 477/121
[58] Field of Search ............... 477/84, 85, 121, 477/128, 129, 138; 701/59, 64, 67

[56] References Cited

U.S. PATENT DOCUMENTS

| | | |
|---|---|---|
| 4,753,134 | 6/1988 | Hayasaki . |
| 4,955,259 | 9/1990 | Narita . |
| 5,016,175 | 5/1991 | Baltusis et al. ............ 477/129 X |
| 5,166,879 | 11/1992 | Greene et al. ............ 477/129 X |
| 5,168,777 | 12/1992 | Isono et al. . |
| 5,396,420 | 3/1995 | Graf ............ 477/128 X |
| 5,417,626 | 5/1995 | Gierer . |
| 5,436,834 | 7/1995 | Graf et al. ............ 477/129 X |
| 5,459,658 | 10/1995 | Morey et al. ............ 477/129 X |
| 5,470,288 | 11/1995 | Palansky et al. ............ 477/110 |
| 5,475,590 | 12/1995 | Palansky et al. ............ 701/67 |
| 5,568,748 | 10/1996 | Carlson et al. ............ 477/120 X |
| 5,603,672 | 2/1997 | Zhang ............ 477/121 X |
| 5,618,243 | 4/1997 | Kondo et al. ............ 477/144 X |

FOREIGN PATENT DOCUMENTS

| | | |
|---|---|---|
| 0337495 | 10/1989 | European Pat. Off. . |
| 0324758 | 7/1990 | European Pat. Off. . |
| 0440748 | 9/1993 | European Pat. Off. . |
| 4111514 | 10/1991 | Germany . |
| WO 9004732 | 5/1990 | WIPO . |

*Primary Examiner*—Rodney H. Bonck
*Assistant Examiner*—Peter T. Kwon
*Attorney, Agent, or Firm*—Davis and Bujold

[57] ABSTRACT

The proposal is for a process for controlling an automatic transmission in which, on the basis of a speed-change demand, an electronic control device determines a mode of changing (F1, F2, F3), compares an existing operation point with a theoretical operation point in which the theoretical operation point depends upon the mode of changing and selects a first or second change range.

3 Claims, 2 Drawing Sheets

PROCESS FOR CONTROLLING AN AUTOMATIC GEARBOX

The invention concerns a process for controlling an automatic transmission.

In a first kind of automatic transmissions known from the prior art, for example, EP-PS 0 324 758, a clutch valve is coordinated with a clutch. The clutch valve here determines the pressure curve and the pressure level in the clutch during a gearshifting operation. The clutch valve consists of a valve slide with control pistons, a pressure spring and a piston. The pressure spring supports itself, on one side, on the valve slide with control pistons and, on the other side, on the inner side of the piston. The piston is movable, the same pressure level appearing on the outer side of the piston as in the clutch. The force resulting from the pressure moves the piston. Said force is oriented opposite to the force of the pressure spring. The constant stiffness and the pitch of spring thus establish a gradient of the pressure ramp on the clutch and the height of the pressure. The inner side of the piston can, in addition, be loaded with pressure. It is accordingly possible, by said added pressure, to raise the pressure ramp. The load take-up point of the clutch falls in the area of the pressure ramp. On the load take-up point the clutch takes over the engine torque. The pressure level on the inner side of the piston is determined by an electromagnetic pressure regulator of an electronic control device. It is known that on the basis of different input quantities such as engine torque, vehicle speed and throttle-valve signal, the electronic control device calculates the pressure level in the clutch to be gearshifted. The electronic control device differentiates here an upshift or a downshift and a first or second change range, that is, push or pull. In changes near the push/pull transition, the electronic control device calculates, based on the input quantity, a lower pressure value for the piston inner side of the clutch valve. Due to the pressure spring, a ramp-shaped pressure curve appears on the clutch so that the clutch reliably takes over the engine torque.

In a second kind of automatic transmission also known from the prior art, for example, EP-PS 0 440 748, an electromagnetic pressure regulator directly determines the pressure curve of the clutch to be gearshifted. The electromagnetic pressure regulator here reproduces the pressure ramp. In gearshifts near the push/pull transition, the problem that the electronic control device calculates a low pressure value on the basis of the input quantity appears. This, in turn, causes that the load take-up point of the clutch to be gearshifted very late in time so that long gearshifting times can occur. For reasons of safety, such automatic transmissions have a timed step which limits the maximum gearshifting time. After expiration of said time step, the clutch to be gearshifted necessarily becomes engaged with a very high pressure level. This causes a notable shifting jolt and an unacceptable loss of comfort.

The problem to be solved by the invention is to avoid said disadvantages in an automatic transmission of the second kind.

According to the invention the problem is solved by a process for control of an automatic transmission with clutches, the shifting state and pressure curve of which are determined by electromagnetic adjusting members of an electronic control device, said electronic control device, on the basis of input quantities, detects a driver's demand change to upshift or downshift and herefrom determines a mode of changing. The mode of changing corresponds to an upshift by one gear, or a downshift by one gear, or a downshift by more than one gear. From a parameter representative of the driver's desired performance and a speed of an internal combustion machine or output speed of the automatic transmission, the electronic control device determines an existing operation point and, via a performance graph, selects a first or second change range, said performance graph containing coordinations of theoretical operating points with the changing mode. The solution offers the advantage that a change range of its own is coordinated with the changing mode concerned. Hereby it is possible to obtain a better adaptation of the pressure curve of the clutch to be gearshifted to the actual state of the vehicle during speed changes. By speed-change demands, according to the invention, all speed changes that are demanded by exceeding or falling below a changing characteristic line on the basis of input quantities are to be understood. Said input quantities presettable by the driver are, for example, the signal from the throttle valve position, the vehicle speed or the driving activity.

In the development of this, it is proposed that the coordination of the theoretical operation points of the same changing mode be surrounded by a tolerance range. In the development of this it is proposed that when changing the existing operation point in a direction toward the theoretical operation point, the change range be updated only when abandoning the tolerance range. The advantage resulting from this is that a change range is determined only when the existing operation point is certainly in the respective change range. By the tolerance range, deviations from the theoretical operation point which has been determined by testing, for example, to the actual operation point are taken into account on the basis of the serial straying.

The embodiments are shown in the drawings where:

Figure 1:
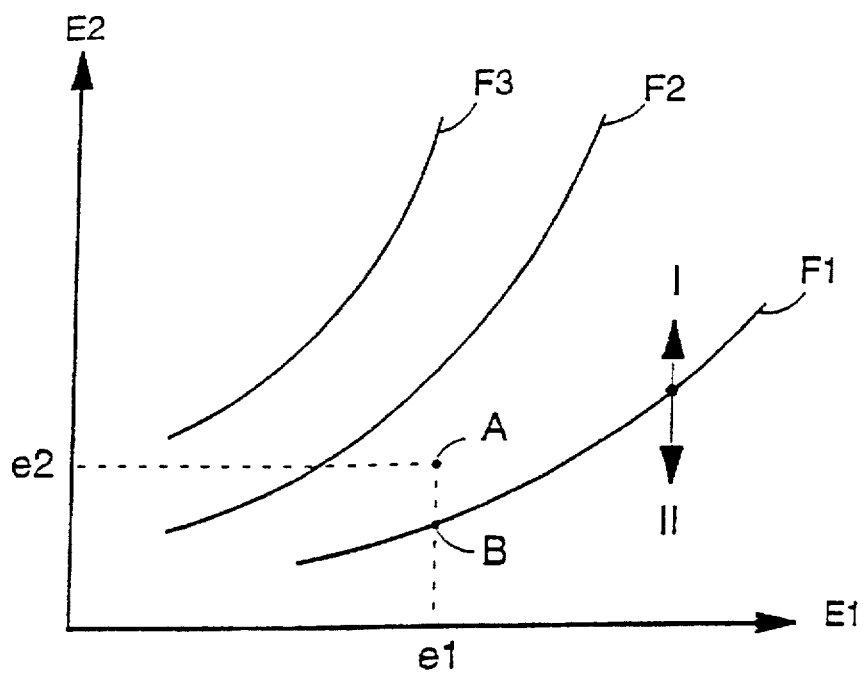
FIG. 1 is a performance graph of the changing modes.

FIG. 1 is a performance graph of the changing modes; F1 here means an upshift by one gear, F2 a downshift by more than one gear and F3 a downshift by one gear. An input quantity E1 is plotted as the abscissa, and this can be, for example, a speed of an internal combustion engine or output speed of the automatic transmission. An input quantity E2 is plotted as the ordinate. This represents the driver's desired performance and can be, for example, the signal of a throttle valve or the torque delivered by the internal combustion engine. Above the characteristic line of the changing mode, that is, to higher values of E2, there is a first change range, below the characteristic line is a second change range. The course of the process is as follows: After the electronic control device has established a speed-change demand, this determines the speed-change mode such as an upshift by one gear. Thereafter, the existing operation point is determined from both input quantities E1 and E2. In FIG. 1 this is point A with the abscissa value e1 and the ordinate value e2. Then the existing operation point A is compared with a theoretical operation point B and, from the comparison results the speed-change range. In FIG. 1 the operation point A is at a value of the input quantity E2 higher than the operation point B. The electronic control device calculates the pressure curve of the clutch to be shifted for an upshift in the first range.

Figure 2:
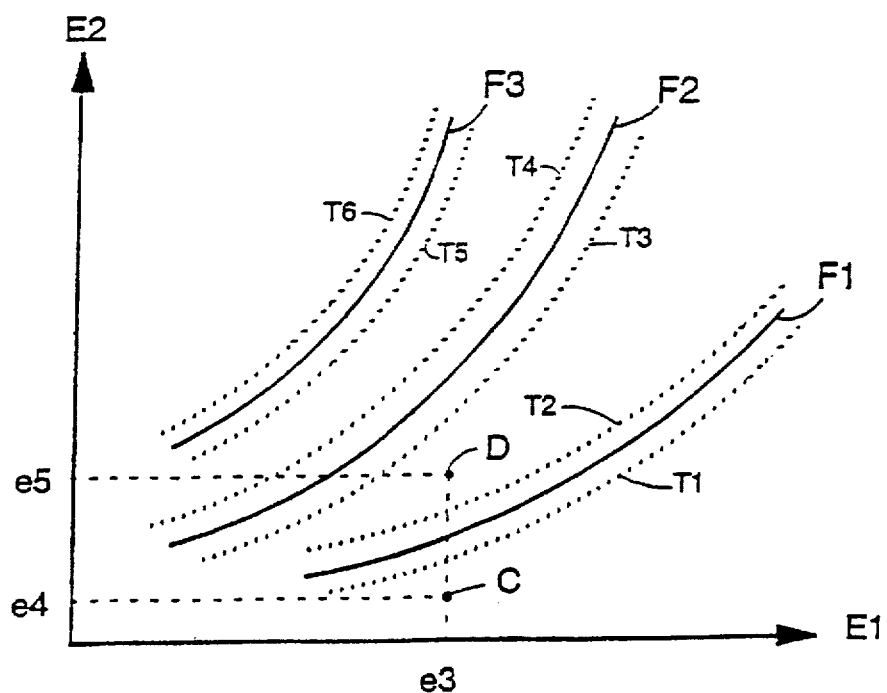
FIG. 2 is a performance graph of the changing modes with tolerance ranges.

FIG. 2 shows the same performance graph of the speed-change modes, but here the three characteristic lines F1, F2 and F3, respectively, are surrounded by a tolerance range T1 and T6. The operation is as follows: After the electronic control device has established a speed-change demand such as an upshift by one gear, it determines the existing operation point on the basis of both input quantities E1 and E2. This corresponds, for example, to point C with the abscissa value e3 and the ordinate value e4. The existing operation point C is in the second speed-change range, that is, below F1. The electronic control device thus calculates a pressure curve in the clutch to be shifted for an upshift in the second change range. If during the speed change the existing operation point changes from C to D, the ordinate value e5, while the driver, for example, actuates the throttle valve, then the electronic control device changes, only when exceeding the tolerance characteristic line T2, the speed-change calculation in the second change range.

Figure 3:
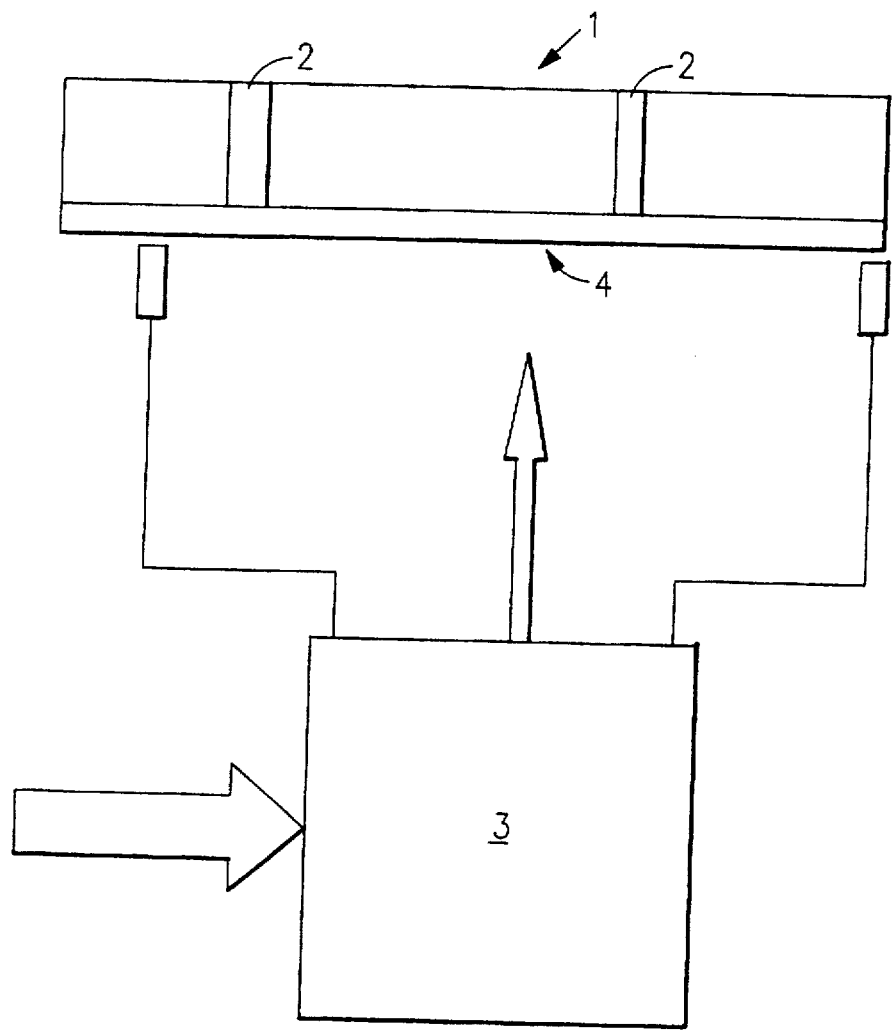
FIG. 3 is a system diagram.

FIG. 3 diagrammatically shows an automatic transmission clutches 2 controlled by an electronic control device 3 which determines the state of the electromagnetic adjusting members 4 of the automatic transmission 2.

| Reference numerals | |
|---|---|
| F1 | characteristic line upshift by one gear |
| F2 | characteristic line downshift by more than one gear |
| F3 | characteristic line downshift by one gear |
| T1/T2 | tolerance range for F1 |
| T3/T4 | tolerance range for F2 |
| T5/T6 | tolerance range for F3 |
| E1 | input quantity |
| E2 | input quantity |
| 1 | automatic transmission |
| 2 | clutches |
| 3 | electronic control device |
| 4 | electromagnetic adjusting members. |

We claim:

1. A process for controlling an automatic transmission with clutches in which an electronic control device maintains control wherein a shifting state and pressure curve being determined by electromagnetic adjusting members of said electronic control device, said electronic control device detecting, on a basis of presettable quantities, input by a driver, a speed-change demand for one of an upshift and a downshift thereby ensuring smooth shifts;

wherein said electronic control device, on the basis of the speed-change demand, determines a changing mode, in which a first changing mode corresponds to an upshift by one gear, a second changing mode corresponds to a downshift by one gear and a third changing mode corresponds to a downshift by more than one gear;

said electronic control device determines, from a parameter (E2) representative of a desired performance of the driver and one of a speed of an internal combustion machine and an output speed of said automatic transmission (E1), an existing operation point which is selected from several characteristic lines (F1, F2, F3), depending on the mode of changing, a first range above the selected characteristic line representing a pull range and a second range below the characteristic line representing a thrust range, the electronic control device selecting one of the first and second ranges from the position of the operation point and the pressure curve of the clutches, taking part in the speed change resulting in accordance with the pull or thrust calculation.

2. A process according to claim 1, further comprising the step of surrounding the coordination of the theoretical operation point of the same mode of change (F1, F2, F3) by a changeable tolerance band (T1 to T6).

3. A process according to claim 2, further comprising the step of updating the change range, when changing the existing operation point in a direction toward the theoretical operation point, only once the tolerance band is abandoned according to said driver inputs.

* * * * *